US009806981B2

(12) United States Patent
Adachi et al.

(10) Patent No.: US 9,806,981 B2
(45) Date of Patent: Oct. 31, 2017

(54) METHOD OF NOTIFYING FUNCTION IDENTIFICATION INFORMATION AND COMMUNICATION SYSTEM

(71) Applicant: KABUSHIKI KAISHA TOSHIBA, Minato-ku (JP)

(72) Inventors: Tomoko Adachi, Urayasu (JP); Koji Horisaki, Yokohama (JP); Kazumi Sato, Kawasaki (JP); Kiyoshi Toshimitsu, Yokohama (JP); Minoru Namekata, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 272 days.

(21) Appl. No.: 13/743,964

(22) Filed: Jan. 17, 2013

(65) Prior Publication Data

US 2013/0128817 A1    May 23, 2013

Related U.S. Application Data

(62) Division of application No. 11/844,151, filed on Aug. 23, 2007, now Pat. No. 8,412,196, which is a division
(Continued)

(30) Foreign Application Priority Data

Mar. 28, 2002    (JP) .................................. 2002-093094

(51) Int. Cl.
*H04L 12/701*    (2013.01)
*H04L 29/06*    (2006.01)
(Continued)

(52) U.S. Cl.
CPC .............. *H04L 45/00* (2013.01); *H04L 29/06* (2013.01); *H04L 69/24* (2013.01); *H04W 8/26* (2013.01);
(Continued)

(58) Field of Classification Search
CPC ...... H04W 84/12; H04W 48/18; H04W 88/08
(Continued)

(56) References Cited

U.S. PATENT DOCUMENTS 5,386,512 A    1/1995    Crisman et al.
5,600,312 A *  2/1997    Willard ............... H04W 84/022
                                                  340/7.27
(Continued)

FOREIGN PATENT DOCUMENTS

CN    101118560 A    2/2008
EP    1041771 A1    10/2000
(Continued)

OTHER PUBLICATIONS

IEEE Std 802.11-1997, Part 11: Wireless LAN Medium Access Control (MAC) and Physical Layer (PHY) specification, Published 1997.
(Continued)

*Primary Examiner* — Dung Hong
(74) *Attorney, Agent, or Firm* — Oblon, McClelland, Maier & Neustadt, L.L.P.

(57) ABSTRACT

There is disclosed a notification method in a communication system of notifying specific multifunctionality information between terminal stations. An expansion code is generated from both a user input code and a function identification code corresponding to a specific function. A transmission frame including the expansion code is also generated and transmitted to at least one of the terminal stations.

17 Claims, 11 Drawing Sheets

Related U.S. Application Data of application No. 10/400,426, filed on Mar. 28, 2003, now Pat. No. 7,277,932.

(51) Int. Cl.

| | |
|---|---|
| *H04W 8/26* | (2009.01) |
| *H04W 68/00* | (2009.01) |
| *H04W 88/02* | (2009.01) |
| *H04W 92/18* | (2009.01) |

(52) U.S. Cl.
CPC .......... *H04W 68/00* (2013.01); *H04W 88/02* (2013.01); *H04W 92/18* (2013.01)

(58) Field of Classification Search
USPC .... 455/127.4, 552.1, 435.1–435.3, 450, 451, 455/452.1, 452.2; 370/395.2, 395.21
See application file for complete search history.

(56) References Cited

U.S. PATENT DOCUMENTS

| | | | |
|---|---|---|---|
| 5,706,428 A * | 1/1998 | Boer | H04B 1/707 370/342 |
| 5,751,731 A * | 5/1998 | Raith | H04J 3/07 714/752 |
| 5,771,352 A | 6/1998 | Nakamura et al. | |
| 5,859,979 A | 1/1999 | Tung et al. | |
| 6,330,335 B1 | 12/2001 | Rhoads | |
| 6,438,591 B1 | 8/2002 | Fehskens et al. | |
| 6,842,460 B1 * | 1/2005 | Olkkonen | H04W 48/16 370/328 |
| 6,901,580 B2 | 5/2005 | Iwanojko et al. | |
| 7,016,948 B1 * | 3/2006 | Yildiz | H04W 24/08 709/221 |
| 7,400,901 B2 | 7/2008 | Kostic et al. | |
| 7,406,319 B2 * | 7/2008 | Kostic | H04L 5/023 455/439 |
| 7,840,221 B1 * | 11/2010 | Kim | H04W 16/08 455/422.1 |
| 2002/0022483 A1 * | 2/2002 | Thompson | H04L 12/1464 455/439 |
| 2002/0085516 A1 * | 7/2002 | Bridgelall | H04W 36/04 370/329 |
| 2002/0176366 A1 * | 11/2002 | Ayyagari | H04L 63/08 370/245 |
| 2003/0142641 A1 * | 7/2003 | Sumner | H04L 63/0428 370/328 |
| 2004/0137894 A1 | 7/2004 | Paivike et al. | |
| 2004/0199615 A1 | 10/2004 | Philyaw | |
| 2008/0033938 A1 | 2/2008 | Okamoto et al. | |

FOREIGN PATENT DOCUMENTS

| | | |
|---|---|---|
| JP | 2000-194745 A | 7/2000 |
| JP | 2005-258678 A | 9/2005 |
| JP | 2005-316899 A | 11/2005 |

OTHER PUBLICATIONS

IEEE Std 802.11b-1999, Part 11: Wireless LAN Medium Access Control (MAC) and Physical Layer (PHY) specification, Published 1999.

Combined Chinese Office Action and Search Report dated Nov. 30, 2015 in Patent Application No. 201280004293.X (with English Translation).

Takayuki Adachi et al., "Wadaigo Chushutsu Kinoo Motta News Stream Etsuran System", Proceeding of the 10th annual meeting of the Association for Natural Language Processing[CDROM], The Association for Natural Language Processing, Mar. 18, 2004, 5 pages.

* cited by examiner

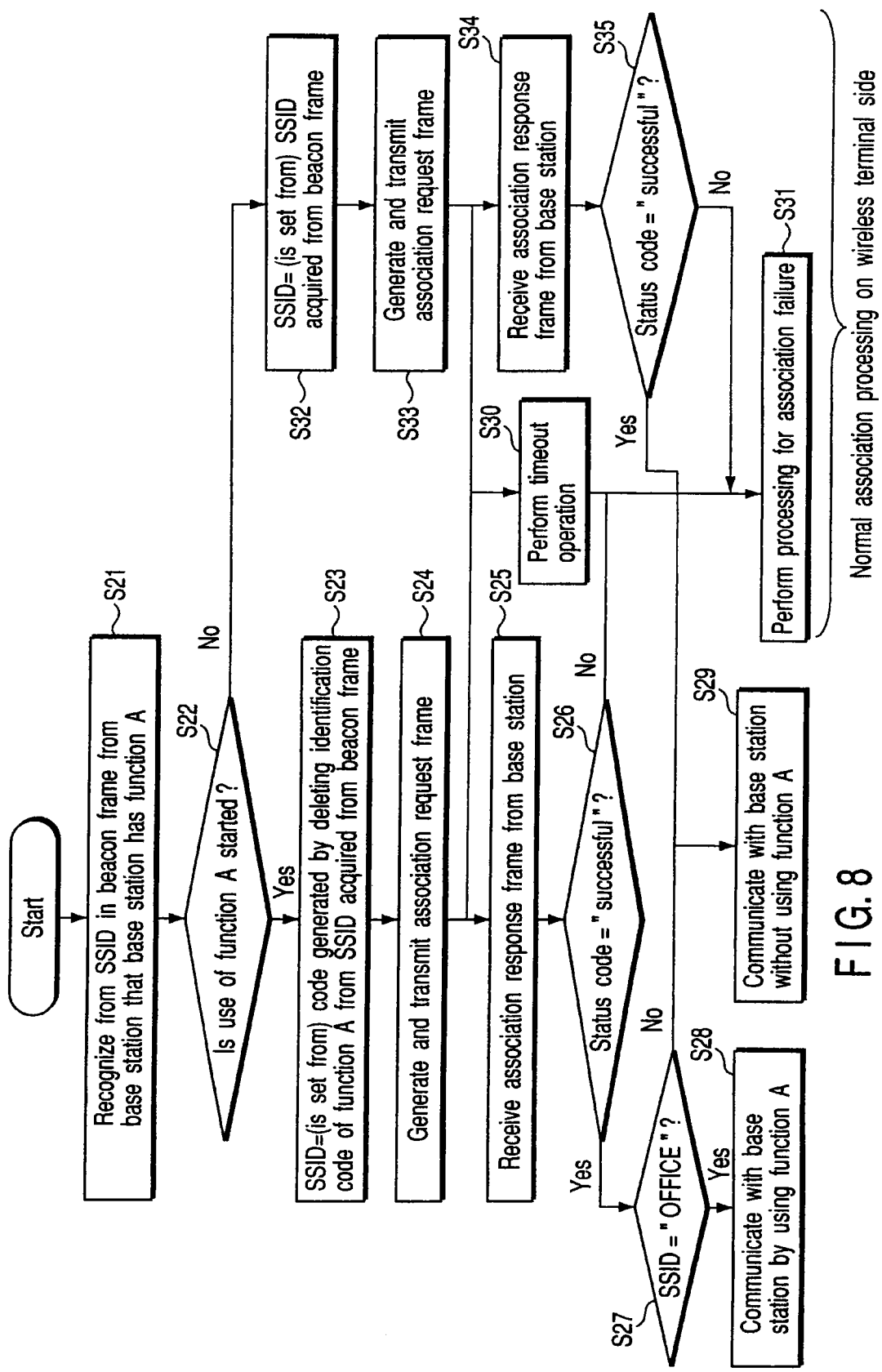
F I G. 8

| Rate | R1 - R4 |
|---|---|
| 6 Mbit / s | 1101 |
| 9 Mbit / s | 1111 |
| 12 Mbit / s | 0101 |
| 18 Mbit / s | 0111 |
| 24 Mbit / s | 1001 |
| 36 Mbit / s | 1011 |
| 48 Mbit / s | 0001 |
| 54 Mbit / s | 0011 |

METHOD OF NOTIFYING FUNCTION IDENTIFICATION INFORMATION AND COMMUNICATION SYSTEM

CROSS-REFERENCE TO RELATED APPLICATIONS

This application is a divisional and is based upon and claims the benefit of priority under 35 U.S.C. §120 for U.S. Ser. No. 11/844,151, filed Aug. 23, 2007 which is a divisional of U.S. Ser. No. 10/400,426, filed Mar. 28, 2003 (now U.S. Pat. No. 7,277,932) and claims the benefit of priority from prior Japanese Patent Application No. 2002-093094, filed Mar. 28, 2002, the entire contents of each of which are incorporated herein by reference.

BACKGROUND OF THE INVENTION

1. Field of the Invention

The present invention relates to a communication system and, more particularly, to a technique of performing mutual authentication of information concerning a new or additional function between a base station and a terminal station in the same system.

2. Description of the Related Art

IEEE 802.11 (ISO/IEC 8802-11: 1999(E) ANSI/IEEE Std 802.11, 1999 edition) is known as one of the specifications for communication systems in which terminal stations and base stations mutually communicate with each other through wireless media. This specification defines medium access control (MAC) layer and physical (PHY) layer specifications.

The MAC layer specification defines an identification value which makes each terminal station in a system to identify a function that is used by each terminal station (or a function that can be used). When a given terminal station is to wirelessly communicate with another terminal station, this identification value is transmitted upon being written in a specific field in a transmission frame. A terminal station which has received this frame determines the function to be used on the basis of the identification information indicated by the specific field, and communicates with the remote terminal station on the basis of the function upon designating the function by frame exchange if needed.

In a conventional communication system complying with an existing specification such as IEEE 802.11, a given terminal station cannot notify, by communication, another terminal station of the possession of a function other than those defined in the specification, cannot recognize a notification concerning such an incompliant function from another terminal station, and cannot notify whether the incompliant function can be used or not.

BRIEF SUMMARY OF THE INVENTION

It is an object of the present invention to provide a communication system which can perform communication using an incompliant function between terminal stations having the incompliant function by making the terminal stations mutually recognize the incompliant function while performing communication using a function complying with a specification between terminal stations using only the function defined in the specification.

According to embodiments of the present invention, there is provided a notification method in a communication system of notifying specific multifunctionality information between terminal stations. An expansion code is generated from both a user input code and a function identification code corresponding to a specific function. A transmission frame including the expansion code is also generated and transmitted to at least one of the terminal stations.

BRIEF DESCRIPTION OF THE SEVERAL VIEWS OF THE DRAWING

FIG. 8 is a flow chart for explaining association processing in a terminal station which has recognized, as a result of receiving a beacon frame in which an SSID including a function identification code is written, that a base station has function A;

DETAILED DESCRIPTION OF THE INVENTION

A wireless communication system according to an embodiment of the present invention will be described below with reference to the several views of the accompanying drawing.

The present invention can be applied to communication systems in general and is not limited to wireless communication systems. The wireless communication systems according to the following embodiments comply with the wireless local area network specification defined in IEEE 802.11. In the following embodiments of the present invention, the term "the IEEE 802.11 wireless LAN family" refers to include various wireless communication systems complying with not only IEEE 802.11, 11a, and 11b, but also complying with additions or modifications thereof and other specifications that will be defined in the future.

(First Embodiment) Recognition Technique for Function between Base Station and Terminal Station (Initiated by Base Station)

A technique for making both a base station and a terminal station recognize a function outside the IEEE 802.11 wireless LAN specification (to be simply referred to as an "incompliant function" hereinafter) will be described first. Assume that the base station has incompliant functions named function A and function B. If any one of the terminal stations wirelessly connected to this base station has function A, the base station wants to use function A between itself and this terminal station. In this case, the base station needs to share the recognition of the possession of function A with the terminal station having function A. The first embodiment is configured to perform notification of function identification information under the initiative of the base station. For the notification of function information, for example, the SSID (Service Set Identifier) defined in the IEEE 802.11 wireless LAN specification can be used.

An SSID is an identifier for designating an ESS (Extended Service Set) or IBSS (Independent Basic Service Set). An ESS is a set of interconnected BSSs (Basic Service Sets), which appears as the same to an LLC (Logical Link Control) layer as a BSS.

The content (value) of an SSID is generally set by user input. A frame including an SSID can be transmitted/received between a terminal station and a base station, between a terminal station and a terminal station, and between a base station and a base station.

Information for the recognition of an incompliant function between a base station and a terminal station will be referred to as "function identification information" in this embodiment. Assume also that in the embodiment, function identification information is an SSID, and the SSID includes a function identification code.

Figure 1:
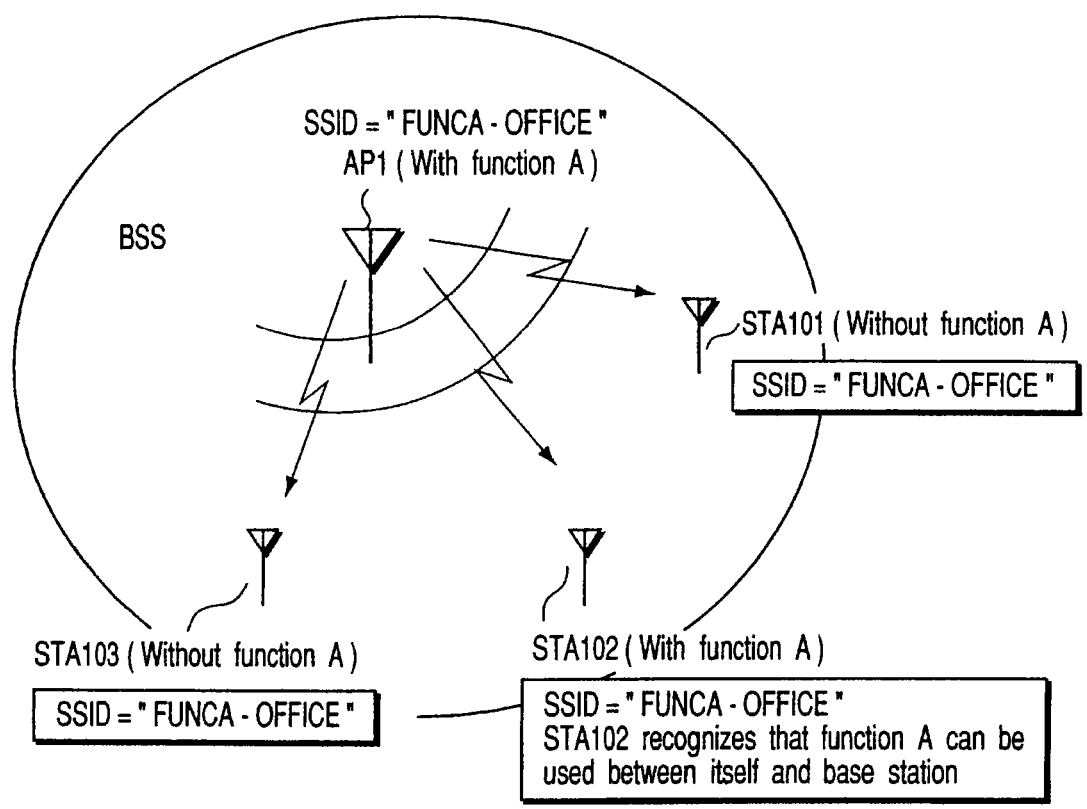
FIG. 1 is a view for explaining an example of the arrangement of a wireless communication system according to an embodiment of the present invention, together with a case wherein it is notified under the initiative of a base station that function A can be used.

FIG. 1 shows one BSS which comprises a plurality of (e.g., three) terminal stations STA101 to STA103 and one base station AP1 which wirelessly connects to the plurality of terminal stations in the IEEE 802.11 wireless LAN system according to this embodiment. In this specification, the term "base station (BS)" is used as a term synonymous with an access point (AP). An access point is an arbitrary constituent element having a station function of providing an associated terminal station with access to various distribution services through wireless media. The BSS shown in FIG. 1 conducts the infrastructure mode of a BSS in which at least one base station ("AP1", in the embodiment) exists.

The present invention can also be practiced in an IBSS communication form based on an independent mode in which no base station exists and terminal stations directly communicate with each other. This is because, in the IBSS communication form, terminal stations use SSIDs when transmitting beacon frames defined in IEEE 802.11. Communication operation between a terminal station and a terminal station can be regarded as the same as that between a base station and a terminal station. If, in communication operation between a base station and a base station, a beacon frame from one base station can be received by the other base station, the same effects as those in the following embodiments can be obtained.

Function identification information is stored in a beacon frame. In this embodiment, the frame is used to notify the function identification information. As described above, the function identification information in this frame is an SSID. According to the IEEE 802.11 specification, however, an SSID is also included in a probe request frame or a probe response frame that is a response to a probe request frame. Therefore, in addition to a beacon frame, these frames may be used to notify function identification information. In addition, another management frame may be used, if possible.

An SSID is set through a management window or the like in the wireless LAN system shown in FIG. 1. Such the management window of this embodiment will be described bellow with reference to FIG. 2A or 2B.

In this embodiment, an SSID is comprised of a function identification code and user input code. A function identification code is set in advance on the system side and cannot be easily changed by the user. A user input code can be arbitrarily set by the user using a character string or the like.

Assume that the terminal stations STA101 and STA103 have neither function A nor function B, but the terminal station STA102 has function A.

Figure 2A:
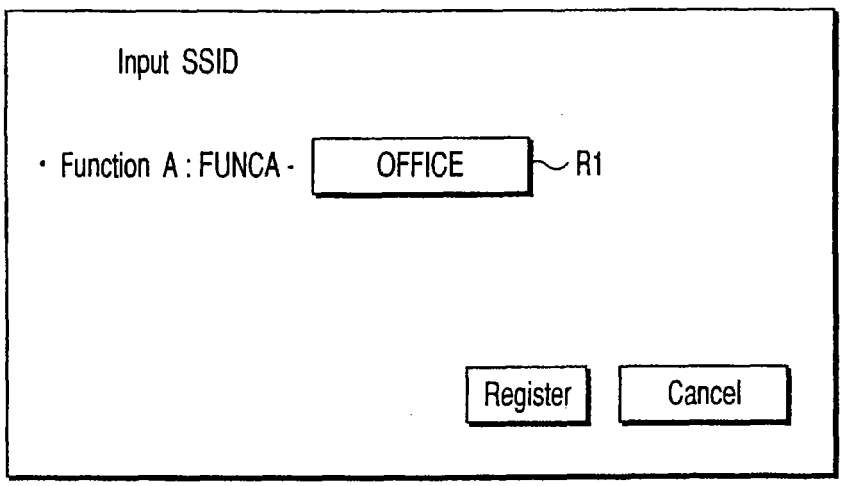
FIG. 2A is a view showing an example of an SSID setting window.

For example, a setting window like that shown in FIG. 2A is displayed on a predetermined display of the base station AP1. If the user inputs "OFFICE" in a user input code input region R1 in the setting window, and selects the "register" button with a mouse or the like, the base station AP1 adds the function identification code "FUNCA-" set in advance in correspondence with function A to "OFFICE", thereby setting the SSID "FUNCA-OFFICE" in the base station AP1.

As described above, this SSID includes the function identification code "FUNCA-" corresponding to function A. Only a base station or terminal station which has function A as, for example, an optional function can recognize that this code "FUNCA-" is a function identification code corresponding to function A. Any terminal station and base station which do not have function A can only understand that the SSID is "FUNCA-OFFICE".

The base station AP1 may have function A and function B and selectively use an SSID depending on whether function A or function B is used. In this case, for example, an SSID setting window like that shown in FIG. 2B may be used. In the setting window shown in FIG. 2B, a function identification code corresponding to function A is "FUNCA-", and a function identification code corresponding to function B is "FUNCB-". In order to make both the two functions effective (usable), the user inputs, for example, "OFFICE" in each of input regions R2 and R3 and selects the "register" button with a mouse or the like. In this case, "FUNCA-OFFICE" is set as an SSID corresponding to function A, and "FUNCB-OFFICE" is set as an SSID corresponding to function B. Obviously, when the user wants to make only function A effective, he/she inputs "OFFICE" in only the input region R2 and selects the "register" button with the mouse or the like as in the case shown in FIG. 2A. Likewise, when the user wants to make only function B effective, he/she inputs "OFFICE" in only the input region R3 and selects the "register" button with the mouse or the like.

In this case, the base station AP1 writes the SSID "FUNCA-OFFICE" in a beacon frame when desiring to use function A, and writes the SSID "FUNCB-OFFICE" in a beacon frame when desiring to use function B. The base station AP1 may then announce the corresponding information to a terminal station or another base station which is to connect to the base station AP1. Note here that beacon frames, an SSID each of which is registered for specifying either function A or B respectively, may be repeatedly announced when validating (announcing) both function A and B by the base station AP1.

A given terminal station or another base station which tries to wirelessly connect to the base station AP1 receives the beacon frame transmitted from the base station AP1, and requests connection to the base station AP1 by using the SSID in the frame. If, for example, the SSID written in the received beacon frame is an SSID corresponding to function A, only a terminal station or another base station which has function A can recognize the identification code of function A in the SSID.

Figure 3:
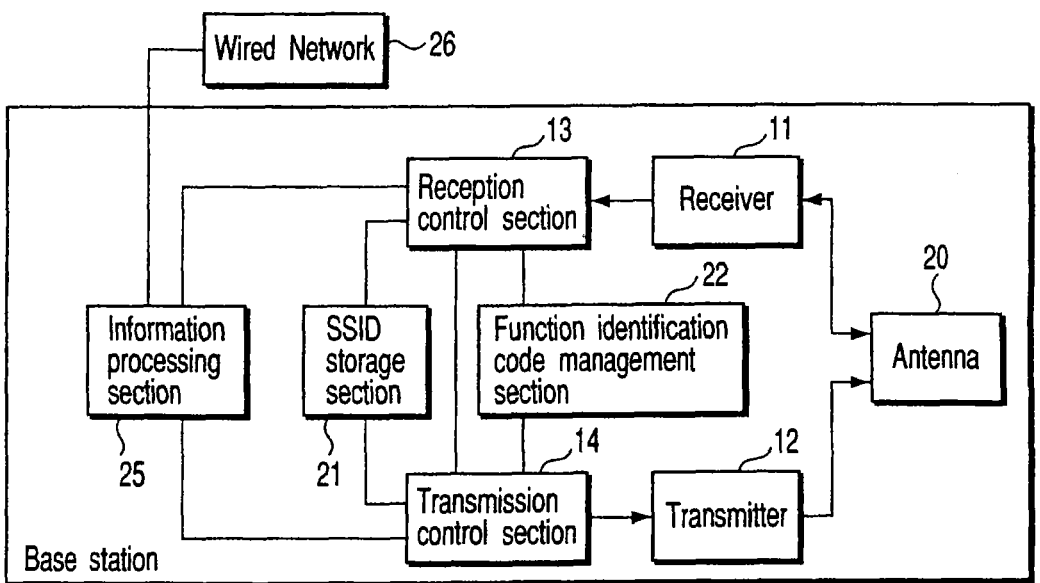
FIG. 3 is a block diagram schematically showing an example of the configuration of a base station.

FIG. 3 shows an example of the configuration of the main part of the base station AP1.

Referring to FIG. 3, a receiver 11 receives a transmission signal from a terminal station through an antenna 20, and generates a reception signal by processing including demodulation and decoding. A transmitter 12 generates transmission signals to be transmitted to terminals through the antenna 20, and supplies these transmission signals to the antenna 20.

A reception signal from the receiver 11 is input to a reception control section 13 and subjected to predetermined reception processing complying with IEEE 802.11 (including also IEEE 802a.11a and IEEE 802.11b). The reception control section 13 also performs predetermined processing on the basis of functions outside IEEE 802.11, e.g., function A and function B. As shown in FIG. 3, data processed by the reception control section 13 may be provided to an information processing section 25. The information processing section 25 extracts and processes data including video, audio, text, and other data types, from the data provided from the reception control section 13. The processing may include, e.g., display processing for a displaying device. The information processing section 25 also handles data generated by user operations and send it to a transmission control section 14. Furthermore, the information processing section 25 may be connected to a wired network 26, to or from which such data as described above may be send or received.

The transmission control section 14 performs predetermined transmission processing complying with IEEE 802.11 (including IEEE 802.11a and IEEE 802.11b), e.g., generating frames to be transmitted to a given terminal station or another base station by broadcasting, multicasting, or unicasting. In addition, the transmission control section 14 performs predetermined processing on the basis of functions outside the IEEE 802.11 specification, e.g., function A and function B. The frame data generated by the transmission control section 14 is transmitted as a transmission signal to a terminal station through the transmitter 12.

Figure 2B:
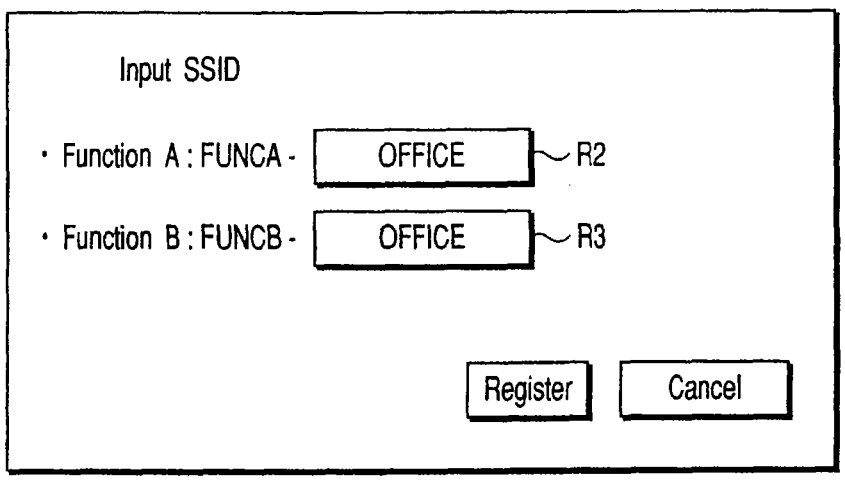
FIG. 2B is a view showing another example of the SSID setting window.

The SSID set through a setting window like that shown in FIG. 2A or 2B is stored in an SSID storage section 21. A function identification code management section 22 stores, for example, the function identification code "FUNCA-" corresponding to function A and the function identification code "FUNCB-" corresponding to function B.

Figure 4:
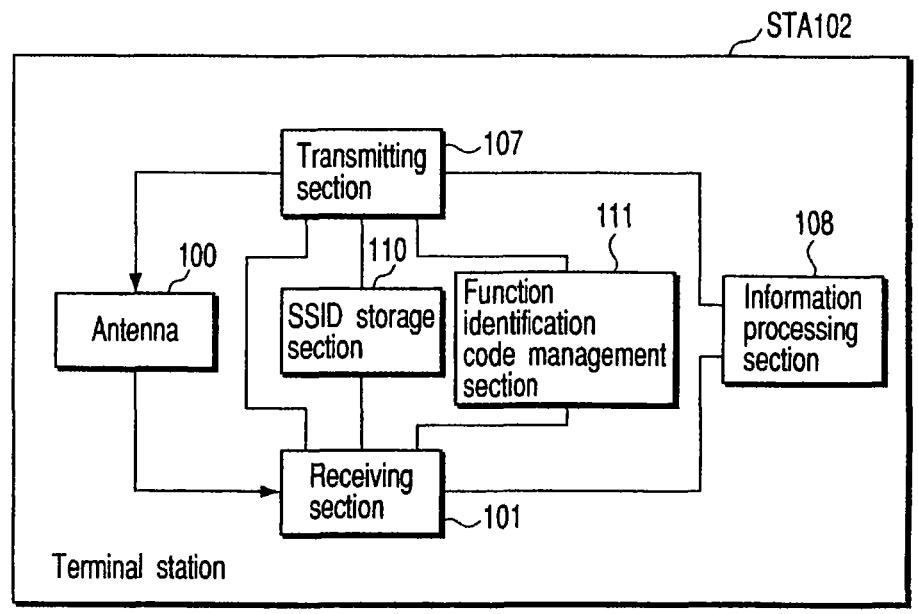
FIG. 4 is a block diagram schematically showing an example of the configuration of a terminal station.

FIG. 4 schematically shows an example of the configuration of the main part of the terminal station STA102.

The terminal station STA102 is comprised of at least an antenna 100, receiving section 101, transmitting section 107, and information processing section 108.

The information processing section 108 corresponds to a section for processing a protocol at a layer higher than the MAC layer. For example, the information processing section 108 generates transmission data comprised of an IP packet of TCP/IP. The information processing section 108 transfers the generated transmission data to the transmitting section 107. The transmitting section 107 converts the transmission data into a MAC frame defined in IEEE 802.11. The MAC frame is converted into a wireless signal having a predetermined frequency. This signal is then supplied to the antenna 100 and transmitted as a radio wave therefrom.

The wireless signal received by the antenna 100 is converted into a MAC frame as digital data by the receiving section 101. Reception data is extracted from the data field in this MAC frame and transferred to the information processing section 108. The information processing section 108 performs processing such as displaying the reception data.

The receiving section 101 and transmitting section 107 mainly perform reception processing and transmission processing complying with IEEE 802.11, respectively, and also perform predetermined processing based on a function outside the IEEE 802.11 specification, e.g., function A.

An SSID storage section 110 stores the SSID extracted from the beacon frame received from the base station AP1. A function identification code management section 111 stores a function possessed by the terminal station, for example, the function identification code "FUNCA-" corresponding to function A in this case.

Figure 5:
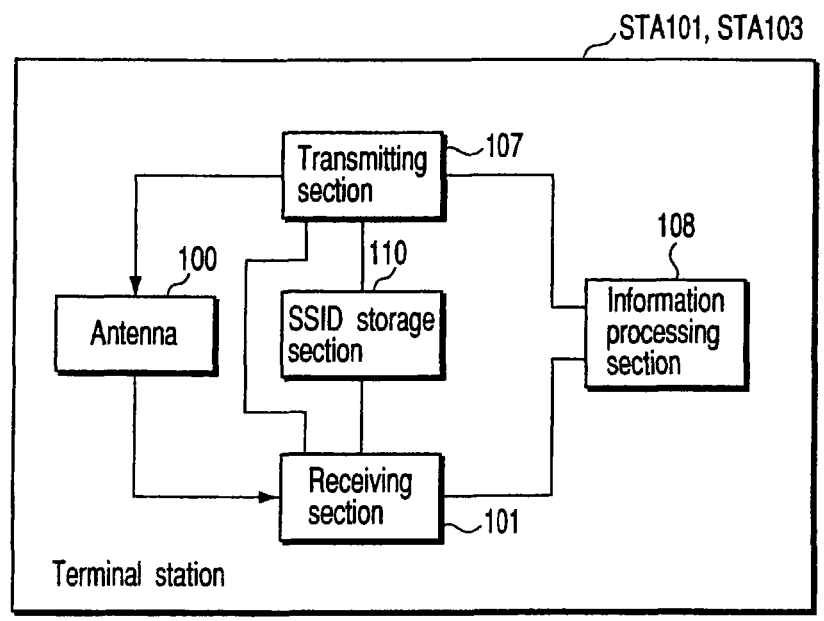
FIG. 5 is a block diagram schematically showing another example of the configuration of the terminal station.

FIG. 5 schematically shows an example of the configuration of the main part of each of the terminal stations STA101 and STA103. The same reference numerals as in FIG. 4 denote the same part in FIG. 5, and only different part will be described. Each of the terminal stations STA101 and STA103 is a terminal station of a type that has no optional function like function A and complies with at least IEEE 802.11. This terminal station has no function of recognizing a function identification code, and hence does not have the function identification code management section 111.

Each of the terminal stations STA101 and STA103 can be said to be a terminal station that is lower in version or performance than the terminal station STA102.

Figure 6:
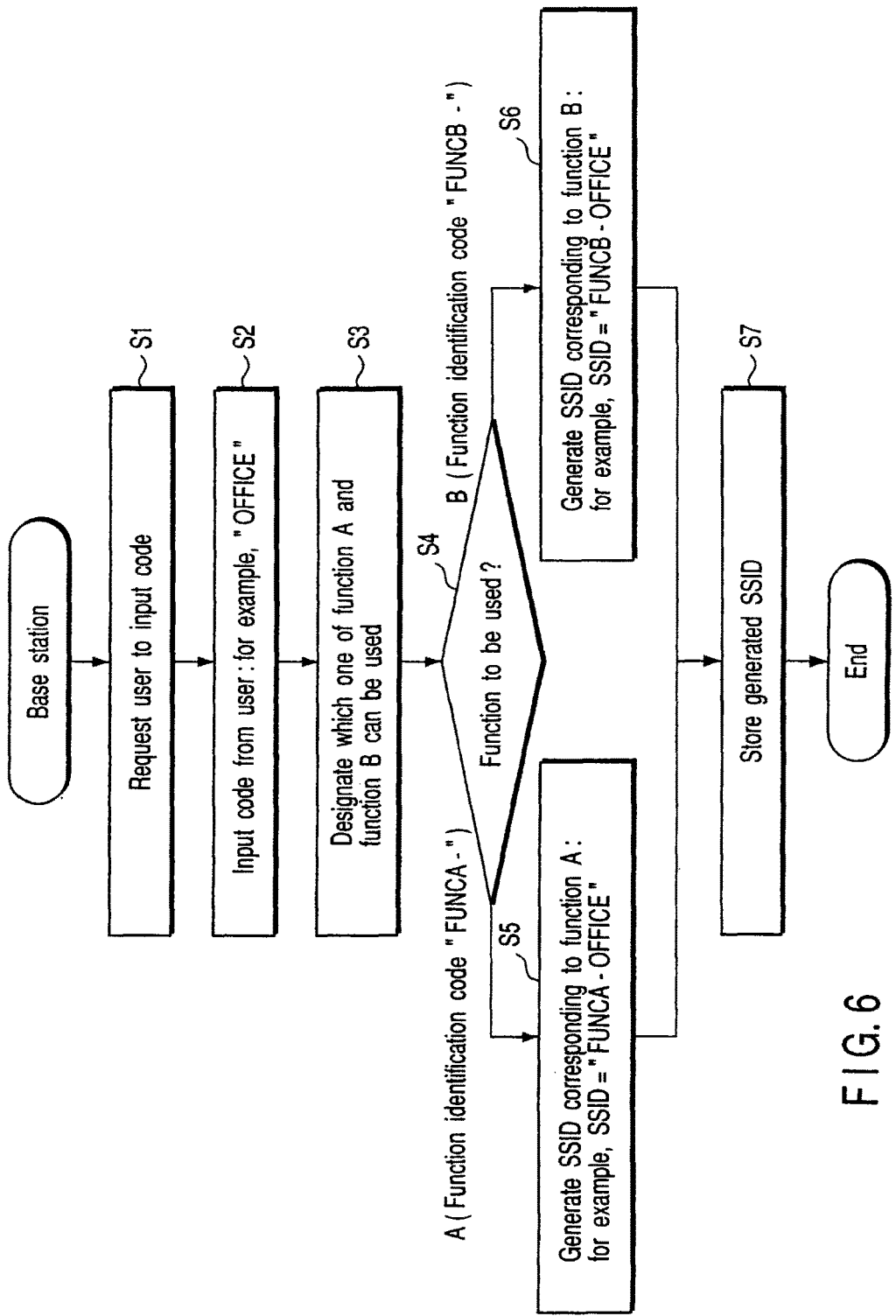
FIG. 6 is a flow chart showing an example of a procedure for setting an SSID.

An example of operation of setting an SSID in the base station AP1 will be described first with reference to the flow chart of FIG. 6.

When an SSID is to be set, a setting window like that shown in FIG. 2B is displayed on a predetermined display of a base station apparatus (step S1). The user inputs a desired code (user input code), e.g., "OFFICE", in an input region in this window (step S2). If the user is to use function A at this time, he/she inputs "OFFICE" in only the input region R2, and selects the "register" button. If the user is to use function B, he/she inputs "OFFICE" in only the input region R3, and selects the "register" button (step S3). A function identification code corresponding to function A is set in advance to be "FUNCA-" and stored in the function identification code management section 22. When function A is to be used, therefore, "FUNCA-OFFICE" is generated as an SSID (steps S4 and S5). A function identification code corresponding to function B is set in advance to be "FUNCB-" and stored in the function identification code management section 22. When function B is to be used, therefore, "FUNCB-OFFICE" is generated as an SSID (steps S4 and S6). The SSID generated in this manner is stored in the SSID storage section 21 (step S7). Subsequently, the SSID stored in the SSID storage section 21 is read out by the transmission control section 14 and written in a frame such as a beacon frame.

IEEE 802.11 defines that an SSID should be written at a predetermined position in the frame body of a beacon frame. The base station AP1 writes "FUNCA-OFFICE" stored in the SSID storage section 21 as an SSID in a beacon frame, and broadcasts it.

Figure 7:
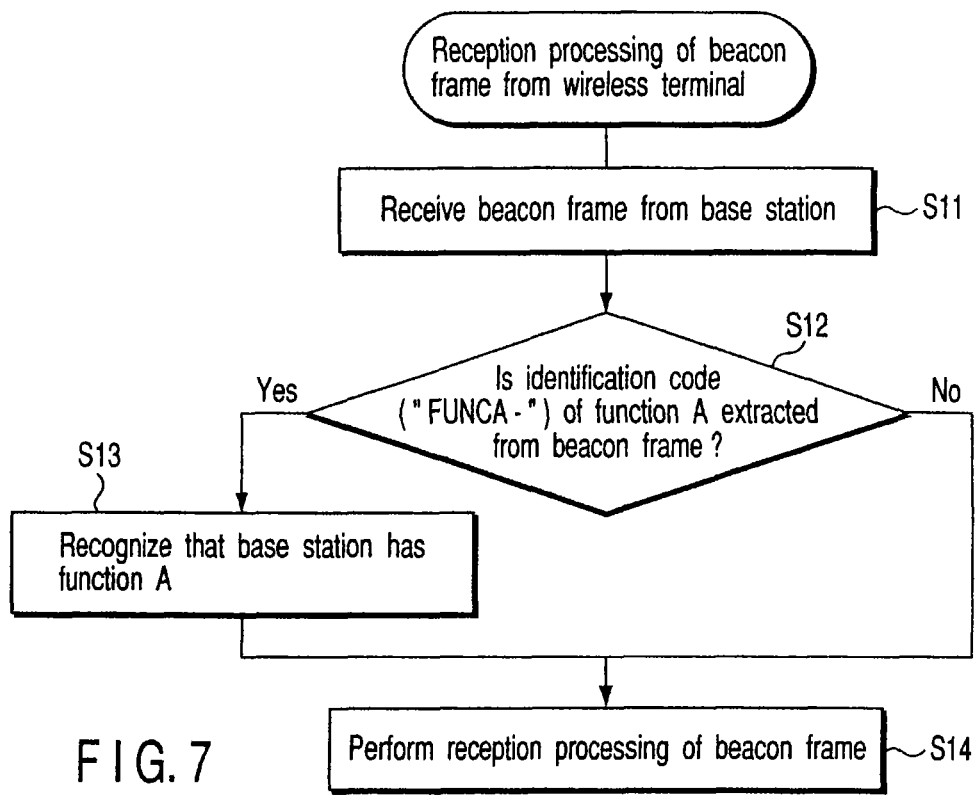
FIG. 7 is a flow chart for explaining reception processing of a beacon frame in a terminal station.

Operation on the terminal station side upon reception of this beacon frame will be described next with reference to the flow chart of FIG. 7.

If there is no need to discriminate the terminal stations STA101 to STA103, they will be simply referred to as "terminal stations", and the reference numerals will be omitted.

A terminal station receives a beacon frame from the base station AP1 (step S11). In the case of the terminal station STA102 having function A, the receiving section 101 has a function of extracting the function identification code "FUNCA-" corresponding to function A from the SSID written in the received frame. The receiving section 101 extracts the SSID, i.e., "FUNCA-OFFICE", from the received beacon frame, and compares it with the function identification code stored in the function identification code management section 111, thereby extracting the function identification code "FUNCA-" corresponding to function A from the SSID. The terminal station STA102 which could extract the function identification code "FUNCA-" can recognize that the base station AP1 can use function A (step S13). Thereafter, the flow shifts to reception processing for the beacon frame defined in IEEE 802.11 (step S14).

In the above case, the extraction processing for a function identification code is performed before the normal reception processing for a beacon frame. However, the present invention is not limited to this. Reception processing for a beacon frame can be done in any step as long as an SSID can be extracted from the beacon frame.

If the terminal station STA101 or STA103 which has no function A (cannot use it) receives a beacon frame from the base station AP1 (step S11), since the station has no function of extracting an SSID from a function identification code as described above, the flow directly shifts to the reception processing for a beacon frame defined in IEEE 802.11 (step S14).

Assume that the terminal station STA102 has function B instead of function A. In this case as well, a function identification code may be extracted from the SSID extracted from the beacon frame in the same manner as described above.

If no function identification code corresponding to the function possessed by the terminal station STA102 can be extracted as a result of the extraction processing for a function identification code corresponding to function A or function B (step S12), the flow advances to step S14 to perform normal reception processing for a beacon frame defined in IEEE 802.11.

As described above, if a base station has a function outside the IEEE 802.11 specification, the base station can announce the corresponding information to a terminal station or another base station in the BBS by writing an SSID including a function identification code for identifying the function in a frame (e.g., a beacon frame) defined as a frame in which the SSID is to be written, and transmitting the frame.

Likewise, in the case of an IBSS as well, one terminal station can announce the corresponding information to the other terminal station by writing an SSID including the function identification code of a function outside IEEE 802.11 in a frame defined as a frame in which the SSID is to be written, and transmitting the frame to the other terminal station.

This applies to communication between a base station and a base station. When an SSID including the function identification code of a function outside the IEEE 802.11 specification, which is possessed by one base station, is written in a frame defined as a frame in which the SSID is to be written, and the other base station receives it, one base station can announce the corresponding information to the other base station.

This SSID including the function identification code can be simply used as an SSID by a terminal station or base station which has no function of extracting a function identification code from the SSID. The present invention is suitably applied to a wireless LAN system comprised of a plurality of terminal stations that differ in version or function and base stations. In this system, the use of an SSID including a function identification code has no adverse effect.

Association processing in the terminal station STA102 which has recognized that the base station AP1 has function A, as a result of receiving a beacon frame in which an SSID including a function identification code is written, will be described next with reference to the flow chart of FIG. 8. Association processing in the base station AP1 will be described with reference to the flow chart of FIG. 9.

Upon reception of a notification from the base station AP1, the terminal station STA102 recognizes that the base station AP1 can use function A (step S21). Step S21 corresponds to step S13 in the operation shown in FIG. 7. In performing communication by using function A, the terminal station STA102 must notify the base station AP1 that the terminal station itself has function A. This notification can be done by using association processing.

Assume that the terminal station STA102 has not done the association processing defined in the IEEE 802.11 specification with the base station AP1. In this case, in the process of this association, the terminal station STA102 writes "OFFICE", which is obtained by removing the function identification code "FUNCA-" from the SSID ""FUNCA-OFFICE" including the function identification code acquired in the above reception processing of the beacon frame, in an SSID element in an association request frame which should be transmitted from the terminal station STA102 to the base station AP1, and transmits the association request frame (steps S22 to S24).

Figure 9:
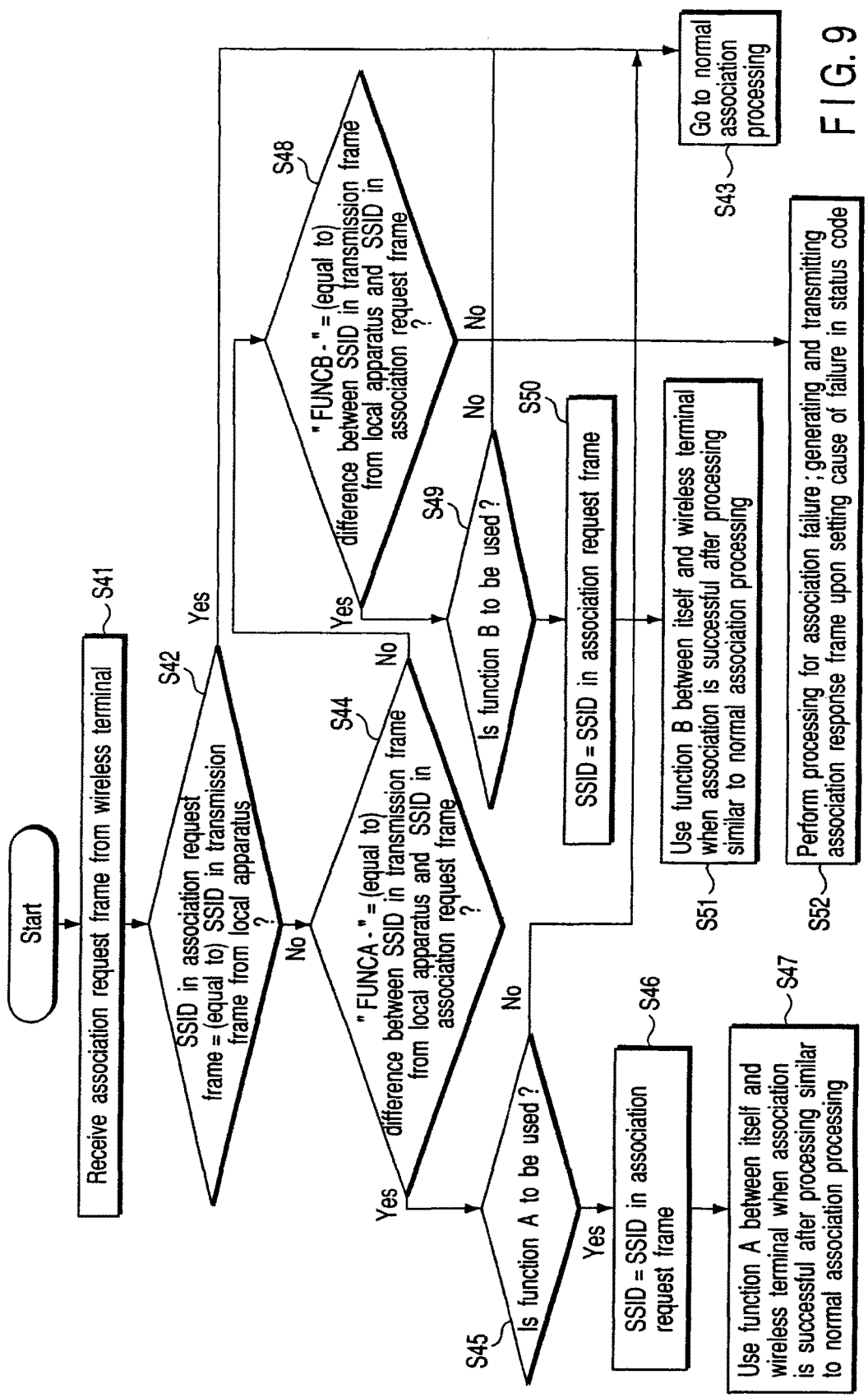
FIG. 9 is a flow chart for explaining association processing in a base station.

As shown in FIG. 9, the base station AP1 receives the association request frame from the terminal station STA102. The reception control section 13 of the base station AP1 extracts an SSID by referring to an SSID element in the association request frame, and then compares this SSID with the SSID notified by the base station AP1 using the beacon frame, i.e., "FUNCA-OFFICE" (steps S41 and S42). If the SSID extracted from the association request frame is "FUNCA-OFFICE" (step S42), the normal association processing defined in the IEEE 802.11 specification is performed (step S43). Otherwise, the flow advances to step S44.

In step S44, it is checked whether the difference in character string between the SSID "FUNCA-OFFICE" set in the base station AP1 and the SSID extracted from the association request frame from the terminal station STA102 is identical to the function identification code of function A.

If the above difference is identical to the function identification code "FUNCA-", the base station AP1 recognizes that the terminal station STA102 as the transmission source of the association request frame has function A.

Thereafter, in the base station AP1, the transmission control section 14 performs association processing defined in IEEE 802.11, e.g., generating/transmitting an association response frame (steps S45 to S47). In this case, the base station AP1 may write "OFFICE" in an SSID element in the association response frame to notify the terminal station STA102 of the recognition of the execution of communication with the terminal station STA102 by using function A (step S46).

In step S25, the terminal station STA102 receives the association response frame from the base station AP1. If the status code included in the association response frame is "successful" that indicates association has been successfully done, and the SSID is "OFFICE", the terminal station STA102 communicates with the base station AP1 by using function A (steps S26 to S28). If the SSID is not "OFFICE", the terminal station STA102 communicates with the base station AP1 without using function A (steps S26 to S29). If the status code contained in the association response frame is not "successful", the flow advances to the processing of association failure (steps S26 to S31).

If an association request frame is generated and transmitted in step S24 and no response frame is transmitted after a lapse of a predetermined period of time (step S30), the flow advances to the processing at the time of association failure (step S31). If it is determined in step S22 that the terminal station STA102 itself does not use function A, the association processing defined in IEEE 802.11 like that indicated by steps S32 to S35 is performed. In this case, the SSID written in the received beacon frame, i.e., "FUNCA-OFFICE", is written in the SSID element in the association request frame to be transmitted. If it is determined in step S35 that the status code written in the association response frame from the base station is "successful" indicating that association has been successfully done, the flow shifts to step S29.

The terminal station STA102 has function A, and rewrites the SSID element in the association request frame in the above manner to notify the base station AP1 that the terminal station has function A. In this case, there may be a terminal station which does not have function A but can support function A. Such a terminal station may use an SSID element to notify that it supports function A. Note that to support function A means that although the terminal station cannot perform transmission by using function A, but can receive at least a transmission frame from another station using function A. Upon recognizing by a notification that the terminal station STA102 supports function A, the base station AP1 can transmit a frame to the terminal station STA102 by using function A.

If the SSID is set to "FUNCB-OFFICE" in the base station AP1, the flow in the processing shown in FIG. 9 inevitably advances from step S44 to step S48. The base station AP1 checks whether the difference in character string between the SSID "FUNCB-OFFICE" and the SSID extracted from the association request frame is identical to the function identification code of function B.

In step S24 in FIG. 8, the terminal station STA102 transmits an association request frame in which "OFFICE" obtained by removing "FUNCB-" from the SSID is written in an SSID element. Upon reception of this frame, therefore, the base station AP1 can extract the function identification code "FUNCB-" of function B as the difference between the SSID "FUNCB-OFFICE" and the SSID extracted from the association request frame. This makes it possible for the base station AP1 to recognize that the terminal station STA102 as the transmission source of the association request frame has function B.

In the base station AP1, the transmission control section 14 performs the association processing defined in IEEE 802.11, e.g., generating/transmitting an association response frame (steps S49 to S51). In this case, the base station AP1 may write "OFFICE" in the SSID element in the association response frame to notify the terminal station STA102 of the recognition of the execution of communication with the terminal station STA102 by using function B (step S50).

If no function identification code can be extracted in step S48, the SSID in the received association request frame is an invalid code. In this case, the base station AP1 writes a code indicating an association failure between itself and the terminal station STA102 in a status code write region in an association response frame for notifying the association failure, and transmits the frame to the terminal station STA102 (step S52).

Upon extraction of a function identification code from the beacon frame transmitted from the base station AP1, the terminal station STA102 may use (or support) function A in transmitting an association request frame to the base station AP1 to notify the base station AP1 that the terminal station has function A or can support it.

After the terminal station STA102 notifies the base station AP1 that the terminal station has function A or can support it, the use start timing of function A may be synchronized between the base station AP1 and the terminal station STA102. In this case, frame exchange or one-way notification may be done as needed.

The terminal station STA102 may be configured to determine a time point at which the use of function A is started. For example, a time point at which the terminal station STA102 rewrites an SSID written in the SSID element in an association request frame may be set as a time point at which the use of function A is started.

Association processing in the terminal stations STA101 and STA103 having no function A is defined in IEEE 802.11. In this case, "FUNCA-OFFICE" written in the received beacon frame is written in the SSID element in the association request frame, and the frame is transmitted to the base station AP1.

The above embodiment has exemplified the case wherein mutual recognition of a usable function is achieved by using a beacon frame and association response frame. However, the present invention is not limited to this. Since an SSID is also included in a reassociation request frame, a probe request frame, or a probe response frame as a response to the probe request frame, the same effect as described above can be obtained by following the same procedure as described above.

A case wherein the first embodiment described above is applied to a wireless LAN system complying with IEEE 802.11 will be described by using a more general expression. A function identification code corresponding to function A outside the IEEE 802.11 specification is included in an SSID. The first and second communication apparatuses each having function A can extract a function identification code from the SSID in a reception frame. Each of these communication apparatuses corresponds to a base station or terminal station. The second communication apparatus receives the first frame (e.g., beacon frame) which is the frame to be transmitted from the first communication apparatus to the second communication apparatus and defined to have an SSID written in. The second communication apparatus recognizes that the first communication apparatus can use function A, when it can extract the function identification code of function A from the SSID in the received first frame. The second communication apparatus then notifies the first communication apparatus that the second communication apparatus itself has function A and uses function A. In notifying this, a frame obtained by removing a function identification code from an SSID including a function identification code is transmitted to the first communication apparatus. This transmission frame is the second frame defined to have an SSID written in and corresponds to, for example, an association request frame. Upon reception of the second frame, the first communication apparatus can recognize that the second communication apparatus as the transmission source of the second frame has function A, upon determining that no function identification code is included in the SSID in the second frame.

In order to allow the first and second communication apparatuses to recognize that function A can be used therebetween, any type of frame can be used as long as it is like the first or second frame described above.

That is, each station can recognize a usable function between terminal stations as well as between base stations by using a probe request frame, probe response frame, or the like in the same manner as described above.

Although the first embodiment has exemplified the case wherein a function identification code is included in an SSID, any type of code can be used as long as a function identification code is included in a code other than an SSID and can be transferred between the first and second communication apparatuses.

Although the SSID used by the base station AP1 is comprised of a function identification code and a user input code that can be arbitrarily set by the user, the present invention is not limited to this. If, for example, "OFFICE" is set by the user as the SSID of a BSS to which the base station AP1 belongs, the base station AP1 having function A concatenates the function identification code "FUNCA-" corresponding to function A to "OFFICE" to generate a new SSID. However, the present invention is not limited to this. A new SSID corresponding to function A may be formed from only a user input code by using a predetermined function corresponding to function A.

The base station AP1 may have a plurality of functions outside the IEEE 802.11 specification, in addition to function A, and a plurality of function identification codes like x1, x2, x3, . . . , and selectively use them. Note that if f(x, y) (where x is one of x1, x2, x3, . . . ) is prepared as a function of generating z as an SSID from a function identification code x and a user input code y, a code value z output in accordance with a code taken as x needs to change to allow different functions to be recognized with respect to a given argument y.

Instead of recognizing different functions in accordance with different arguments x, the respective function identification codes may be made to correspond to different functions themselves. For example, a function identification code x1 is made to correspond to function fx1(y); and x2, fx2(y).

Figures 13, 15:
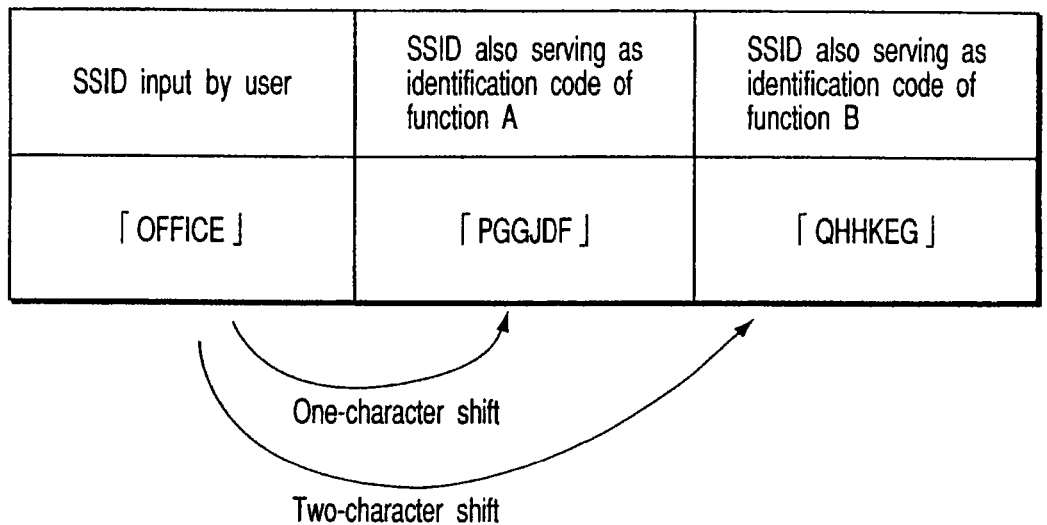
FIG. 13 is a view for explaining a technique for generating an SSID corresponding to each function from the SSID input from the user.
FIG. 15 is a view showing identification codes of transfer rates in the IEEE 802.11a specification.

Consider, as a function of generating an SSID corresponding to each function as described above, a shift function of shifting each character comprising a user input code, e.g., "OFFICE", backward by a predetermined number of characters along the arrangement of each character string. In this case, a shift function fx1(y) corresponding to function A is applied to "OFFICE" to shift each character backward by one character to generate the SSID "PGGJDF" corresponding to function A. Likewise, a shift function fx2(y) is applied to function B to shift each character of "OFFICE" backward by two characters to generate the SSID "QHHKEG" corresponding to function B. These examples are shown in FIG. 13.

In addition, as a method of causing the terminal station STA102 to notify the base station AP1 that the terminal station can use function A, i.e., has function A, can support function A, or starts to use function A, the method of removing a function identification code corresponding to function A from the SSID written in a beacon frame, and transmitting only the code (user input code) input by the user on the base station AP1 side as indicated by step S23 in FIG. 8 has been described above. However, the present invention is not limited to this, and may use a method of causing the terminal station STA102 to obtain a code by processing the SSID notified through a beacon frame by performing arithmetic processing using some function corresponding to function A and transmit it again in a frame. In this case as well, upon reception of a frame including the code as an SSID, the base station AP1 can recognize that the terminal station STA102 has function A, by using a determination step or the like in which the code obtained by, for example, a method of using an inverse function to the function used by the base station AP1 itself is compared with the SSID used by the base station AP1 itself to determine whether they are identical.

(Second Embodiment) Recognition Technique for Function between Base Station and Terminal Station (Initiated by Terminal Station)

Figure 10:
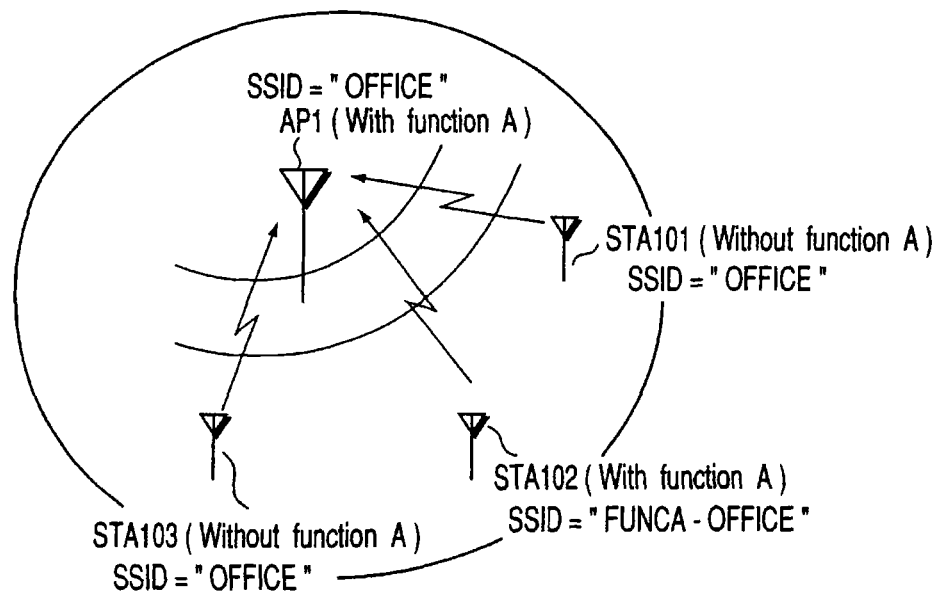
FIG. 10 is a view for explaining an example of the arrangement of a wireless communication system according to an embodiment of the present invention, together with a case wherein it is notified under the initiative of a terminal station that function A can be used.

In the first embodiment, a function is recognized under the initiative of a base station. In this case, however, as shown in FIG. 10, a function is recognized under the initiative of a terminal station in a wireless LAN having an arrangement similar to that shown in FIG. 1. This case will be described with reference to the sequence chart shown in FIG. 11.

Assume that terminal stations STA101 to STA103 in a BSS have recognized by beacon frame transmission from a base station AP1 that an SSID is "OFFICE".

Each of the terminal stations STA101 to STA103 which does not have function A writes the SSID "OFFICE" announced from the base station AP1 in a frame in which the SSID should be inserted, such as an association request frame or reassociation frame, and transmits the frame in a general manner (step S101). Upon reception of such a frame, the base station AP1 recognizes that no function identification code corresponding to function A is added to the SSID included in the frame (step S102), and performs reception processing complying with IEEE 802.11. If, for example, an association request frame is received, the base station AP1 transmits an association response frame (step S103). If a reassociation request frame is received, the base station AP1 transmits an reassociation response frame. In this manner, the base station AP1 performs frame exchange with respect to the terminal station, as needed.

The terminal station STA102 having function A writes an SSID to which the function identification code of function A is added in the SSID element in an association request frame or reassociation frame and transmits the frame to the base station AP1 to notify the base station AP1 that the terminal station has function A (step S104). That is, the terminal station STA102 transmits, as an SSID, "FUNCA-OFFICE" obtained by adding "FUNCA-" which is the function identification code of function A to the head of the original SSID "OFFICE" notified from the base station AP1 over a beacon frame.

For example, the function identification code "FUNCA-" may be arbitrarily set by the user in setting an SSID or may be automatically added on the apparatus side upon possession of function A. At this time, operation of automatically adding the code may be displayed on a user interface to allow the user to recognize the execution of the operation, or may not be displayed. In any case, in all terminal stations and base stations having function A, "FUNCA-" must be set as a function identification code corresponding to function A.

Upon reception of the frame in which the SSID having the function identification code of function A added thereto is written from the terminal station STA102, the base station AP1 tries to extract "OFFICE" which is a valid code from the SSID sent from the terminal station STA102 by using, for example, a function of deleting the function identification code of function A from the SSID. If the code is successfully extracted, the base station AP1 recognizes that the terminal station STA102 can use function A (step S105). Thereafter, the base station AP1 notifies the terminal station STA102 of the use of function A between itself and the terminal station STA102 by using a response frame to the terminal station STA102 with status code "successful" and may also write the obtained valid code, i.e., the SSID "OFFICE", in the SSID element in an association response frame and transmits the frame to the terminal station STA102 to notify the terminal station STA102 that the base station supports function A (step S106).

When an association with the terminal station STA102 is confirmed and an association response frame is to be generated in compliance with IEEE 802.11 in step S106, "successful" is set in a status code, which is a code to indicate a success or failure with respect to a request from the terminal station STA102, and the original SSID "OFFICE" is set in the SSID element in the association response frame. Alternatively, the base station AP1 may write the SSID "FUNCA-OFFICE" with the function identification code notified from the terminal station STA102 in the SSID element in an association response frame instead of writing the original SSID "OFFICE" and set the code "successful" in the status code.

It may be determined in advance in the wireless LAN system whether to use, as an SSID, the original SSID "OFFICE" or the SSID "FUNCA-OFFICE" with a function identification code. It may also be determined in advance in the system whether the base station AP1 receives an SSID with a function identification code from the terminal station STA102 as a notification indicating that the terminal station STA102 has function A, can support function A, or can use function A and will use it.

Since the base station AP1 receives an SSID to which a function identification code is added and an original SSID from a terminal station with function A and a terminal station without function A, the base station AP1 needs to have a function of recognizing the SSID "OFFICE" which is determined in advance in the base station AP1 and also recognizing that an SSID to which the function identification code of function A is added is a code obtained by adding the function identification code to the SSID "OFFICE" determined in advance in the base station AP1.

A procedure for recognizing an SSID and the function identification code added to an SSID in a reception control section 13 of the base station AP1 in steps S102 and S105 in FIG. 11 will be described with reference to the flow chart of FIG. 12.

The reception control section 13 has two functions (first and second functions) to distinguish the SSID "OFFICE" from an SSID to which a function identification code corresponding to, for example, function A is added.

The first function serves to receive the code written in the SSID element in a received frame and directly output the input code as an SSID. The second function serves to receive the code written in the SSID element in a received frame and outputs it upon deleting a function identification code ("FUNCA-") corresponding to function A if it is included in the input code.

The first function is applied to the SSID element in the received frame (step S201). If an output from the first function is the SSID "OFFICE" (step S202), it is determined that the terminal station which is the transmission source of the received frame does not have function A (step S203).

If the output from the first function differs from the SSID "OFFICE" (is an invalid value), the second function is applied to the code in the SSID element (step S204). If an output from the second function is the original SSID "OFFICE" (step S205), it is determined that the terminal station as the transmission source of the received frame has function A (step S206). In this case, if the output from the second function differs from the SSID "OFFICE" (is an invalid value), it is impossible to recognize function A (step S207). If there is another function (e.g., function B), processing similar to that in steps S201 to S207 may be performed by using the first and second functions corresponding to the function.

The above function recognition technique initiated by the terminal station will be described by using a more general expression, exemplifying the case wherein the technique is applied to a wireless LAN system complying with IEEE 802.11. In order to notify the first communication apparatus (corresponding to a base station or terminal station) having function A that the second communication apparatus (corresponding to a base station or terminal station), which also has function A, has function A, the second communication apparatus writes an SSID to which the identification code of function A is added in the SSID write region (SSID element) of the third frame (e.g., an association request frame) which is a frame to be transmitted from the second communication apparatus to the first communication apparatus and initially defined as a frame in which an SSID should be written, and transmits the frame. Upon reception of the third frame, the first communication apparatus recognizes that the second communication apparatus can use function A, when the first communication apparatus can extract a function identification code corresponding to function A together with a valid SSID from the code written in the SSID element in the received frame. In order to notify the second communication apparatus that the first communication apparatus also has function A and wants to use function A, the first communication apparatus writes the original SSID from which the function identification code of function A is deleted, as an SSID, in the fourth frame (e.g., a association response frame) which is a frame to be transmitted from the first communication apparatus to the second communication apparatus and initially defined as a frame in which an SSID should be written. Upon reception of the fourth frame, the second communication apparatus can recognize that the first communication apparatus as the transmission source of the fourth frame has function A, because the function identification code of the SSID in the received fourth frame is not included. Alternatively, the first communication apparatus may write the SSID with the function identification code notified from the second communication apparatus in the SSID element in the fourth frame and set the code "successful" in the status code instead of writing the original SSID.

In order to allow the first and second communication apparatuses to recognize that function A can be used therebetween, any type of frame can be used as long as it is like the third or fourth frame described above.

That is, each station can recognize a usable function between terminal stations as well as between base stations by using a probe request frame, probe response frame, or the like in the same manner as described above.

In addition, the first and second communication apparatuses are required at least to support function A. That is, when function A is to be used between a base station and a terminal station, between terminal stations, or between base stations, it is required that one station have function A, while the other station can perform reception processing in communication using function A. Therefore, the operation of the terminal station STA102 can be replaced with operation of notifying the base station AP1 that function A is supported.

In the second embodiment described above, a function identification code is added to an SSID to notify that function A can be used. However, any type of code may be used as long as a code can be transferred between the first and second communication apparatuses and is obtained by adding a function identification code to a code other than an SSID which itself serves as a certain identification code.

In the above case, the base station AP1 and terminal station STA102 mutually recognize function A. However, the same applies to a case wherein a function other than function A, i.e., function B or the like, is used.

(Third Embodiment)

In the above embodiment, an SSID is rewritten into a code comprised of a function identification code and user input code. The present invention is not limited to this. When, for example, a function identification code is to be represented by an SSID, the SSID set by the user may be processed in accordance with each function defined in the IEEE 802.11 specification. An example of this processing will be described below. An SSID is generated in correspondence with each function by shifting each character comprising the SSID set by the user by a predetermined number of characters backward (or forward) along the arrangement of a character code.

Consider a case wherein in a wireless LAN having an arrangement like that shown in FIG. 10, the user sets "OFFICE" as an SSID, and terminal stations STA101 to STA103 in a BSS have already recognized that the SSID is "OFFICE" upon reception of the beacon frame or the like transmitted from a base station AP1 as in the second embodiment. Only a portion different from that in the second embodiment will be described below.

For example, a base station or terminal station having function A generates, as an SSID corresponding to function A, "PGGJDF" by shifting each character of "OFFICE" by one character backward in alphabetical order. More specifically, "PGGJDF" is generated by shifting "O", "F", and "I" by one character backward to "P", "G", and "J", respectively. Likewise, as an SSID corresponding to function B, "QHHKEG" is generated by shifting each character of "OFFICE" by two characters backward in alphabetical order. More specifically, "QHHKEG" is generated as the SSID of function B by shifting "O", "F", and "I" by two characters backward to "Q", "H", and "K", respectively. These examples are shown in FIG. 13.

In this manner, an SSID corresponding to a new function can be easily generated by shifting the original SSID by some characters (backward). For example, every time a new function is added owing to upgrading or the like, an SSID corresponding to the new function can be easily generated by shifting each character of the SSID "OFFICE" by three or four characters. For example, an SSID corresponding to function C can be easily generated by shifting each character of the original SSID "OFFICE" by three characters backward.

In the base station AP1 or terminal station STA102 having function A, for example, when a function identification code management section 22 or 111 generates an SSID corresponding to function A from the original SSID "OFFICE", the SSID corresponding to each function is stored in an SSID storage section 21 or 110.

Figure 11:
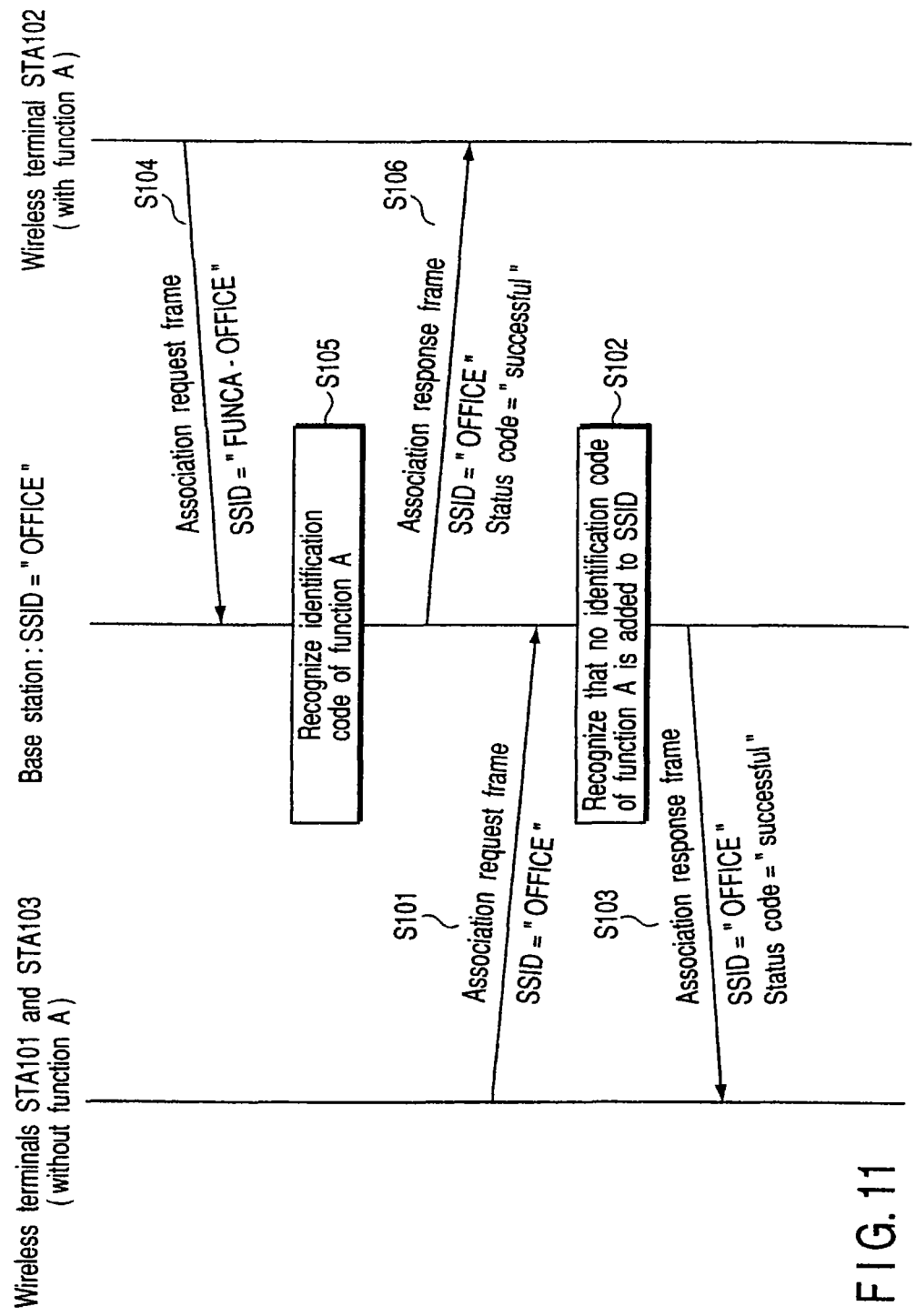
FIG. 11 is a view schematically showing processing in the wireless communication system in FIG. 10 when it is notified under the initiative of a terminal station that function A can be used.

If the terminal station STA101 wants to use, for example, function A (or notify that it has function A), the station writes "PGGJDF", as an SSID corresponding to function A, in the SSID element in the third frame such as an association request frame, and transmits the frame to the base station AP1 (step S104 in FIG. 11). For example, the base station AP1, which has function A and receives this third frame, receives the SSID also serving as a function identification code and the original SSID from the terminal station with function A and a terminal station without function A. The base station AP1 must therefore have a function of recognizing that the SSID "OFFICE" which is set in advance in the base station AP1 and also recognizing that the SSID also serving as the function identification code of function A is obtained by processing the SSID "OFFICE" set in advance in the base station AP1 in accordance with function A. For this purpose, the base station AP1 has the third function corresponding to function A and the above first function.

The third function serves to receive the code written in the SSID element in a received frame and output a code obtained by shifting each character comprising the written code by one character forward.

Figure 12:
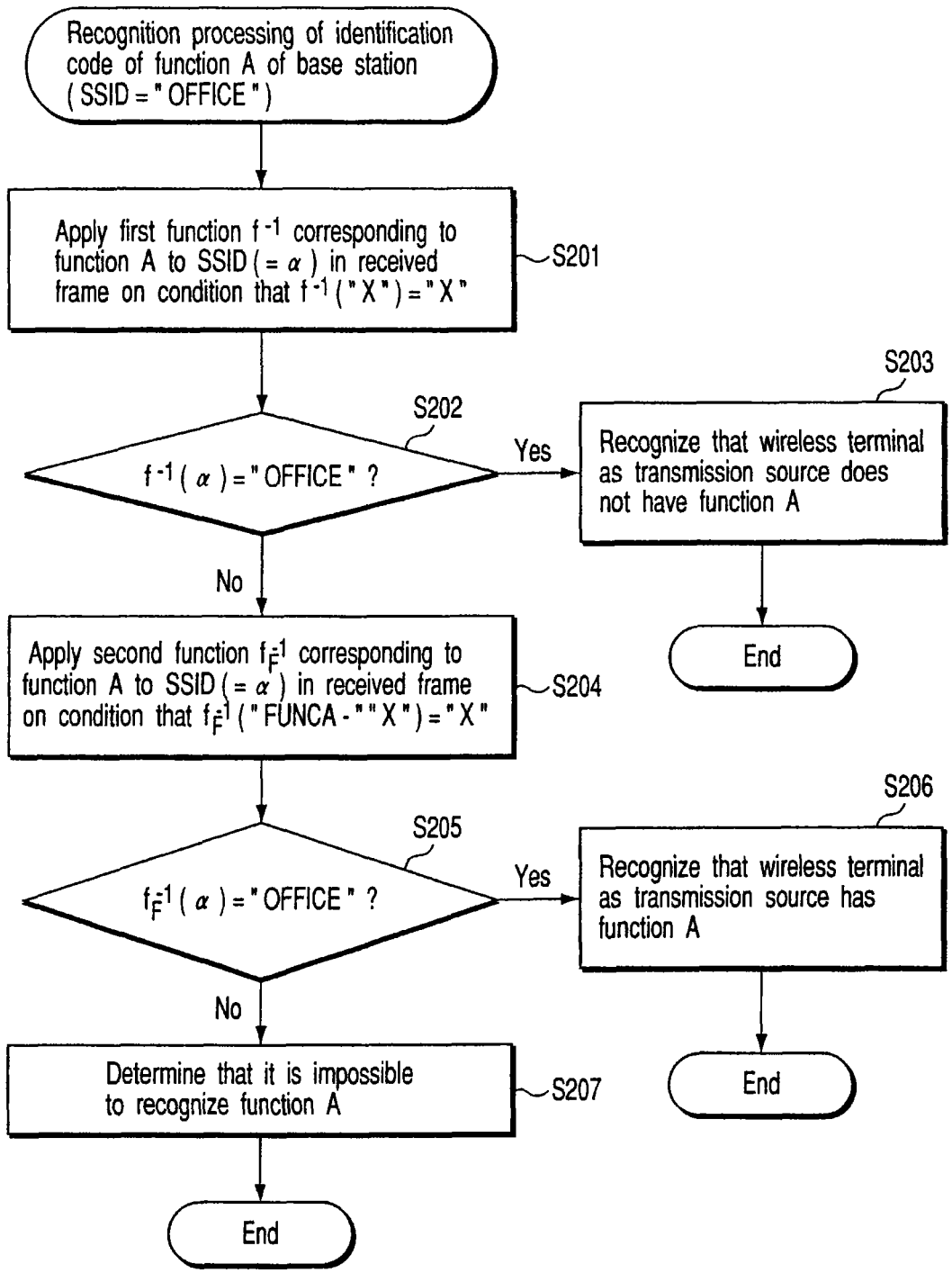
FIG. 12 is a flow chart showing an example of recognition processing of a function identification code in a base station.

First of all, as shown in FIG. 12, the base station AP1 applies the first function to the SSID in the received frame (step S201). If an output from the first function is the SSID "OFFICE" (step S202), the base station AP1 determines that the terminal station as the transmission source of the received frame does not have function A (step S203).

If the output from the first function differs from the SSID "OFFICE" (is an invalid value), the base station AP1 applies the third function to the code in the SSID element (step S204). If an output from the third function is the original SSID "OFFICE" (step S205), the base station AP1 determines that the terminal station as the transmission source of the received frame has function A (step S206). In this case, if the output from the third function differs from the SSID "OFFICE" (is an invalid value), it is impossible to recognize function A (step S207). If, therefore, there is another function (e.g., function B), processing similar to that in steps S201 to S207 may be done by using the first function and the third function corresponding to another function.

In step S106 in FIG. 11, the base station AP1 uses a response frame to the terminal station STA102 to notify the terminal station STA102 that function A will be used between itself and the terminal station STA102, or to notify the terminal station STA102 that the base station AP1 itself has function A or supports it. The base station AP1 writes, in the SSID element in an association response frame, the valid code, i.e., the SSID "OFFICE", obtained by processing the value "PGGJDF" in the SSID element written in the association request frame transmitted from the terminal station STA102, or the value "PGGJDF" of the SSID element written in the association request frame transmitted from the terminal station STA102, sets the code "successful" in a status code, and transmits the resultant frame to the terminal station STA102.

The above operation of the base station can also be applied as the operation of a terminal station.

(Fourth Embodiment)

Notification of function identification information does not depend on only operation of including information concerning function identification in a code such as an SSID which can be arbitrarily set by the user. In the fourth embodiment, one of a plurality of specific fields in a frame is rewritten to establish an exclusive relationship between the values set in the specific fields (in other words, to notify information concerning function identification).

A MAC frame in an IEEE 802.11 wireless LAN system has a MAC header. An MAC header has a "Type" field in which the type of MAC frame is described. A frame whose "Type" field is "00" is a management frame. A frame whose "Type field" is "01" is a control frame.

For example, in a management frame or control frame other than a data frame, "0"s are set in some fields of a MAC header (frame control field), such as "ToDS", "FromDS", or "Order" fields.

In such a management frame or control frame, "1" is intentionally set in a field in which "0" should be set according to the IEEE 802.11 specification. The truth or false of the exclusive OR between this field value and the corresponding value defined in IEEE 802.11 corresponds to the execution/non-execution of notification of function identification information.

Note that a field whose value is intentionally changed may be comprised of a plurality of fields. In the case of a management frame, for example, the value of the "Type" field is "00", and the values of the two fields, i.e., "ToDS" and "FromDS", whose values should be "0" according to the specification may be set to "1" to make, for example, a notification of the identification information of function A.

A more general arrangement of this embodiment is, for example, that of the following communication apparatus. The first communication apparatus (terminal station) transmits, to the second communication apparatus (base station or terminal station), a frame in which the exclusive OR between fields is intentionally changed, in order to notify that the first communication apparatus itself has function A. If the second communication apparatus which has received this frame has function A or can support it, the apparatus must know in advance which field indicates the notification of function identification information.

The second communication apparatus which has received the notification can recognize, on the basis of the frame sent from the first communication apparatus, that the first communication apparatus has function A or can support it.

Note that if a frame including a field indicating the notification of function identification information is sent from the first communication apparatus to another communication apparatus (base station or terminal station) which does not have function A or cannot support it, there is no guarantee that the frame is received and processed as the same as a normal frame. Therefore, notification of function identification information based on this embodiment should be used in a limited manner so as not to interfere with the overall wireless LAN system.

(Fifth Embodiment) Notification of Transfer Rate

For example, in an IEEE 802.11a (ISO/IEC 8802-11: 1999/Amd 1:2000(E)) wireless LAN system which supports multirate operation in a 5-GHz band, when the PHY (Physical) layer generates a PPDU (PLCP Protocol Data Unit) from a fragment (MPDU: MAC Protocol Data Unit) transferred from the MAC layer, one of a plurality of transfer rates, 6, 9, 12, 18, 24, 36, 48, or 54 Mbits/s supported by IEEE 802.11 is set, as a rate to be actually used for the transmission of a subsequent data field in a PPDU frame, in the 4-bit rate field in a signal field. This makes it possible to acquire a PPDU frame on the receiving side.

Figure 14:
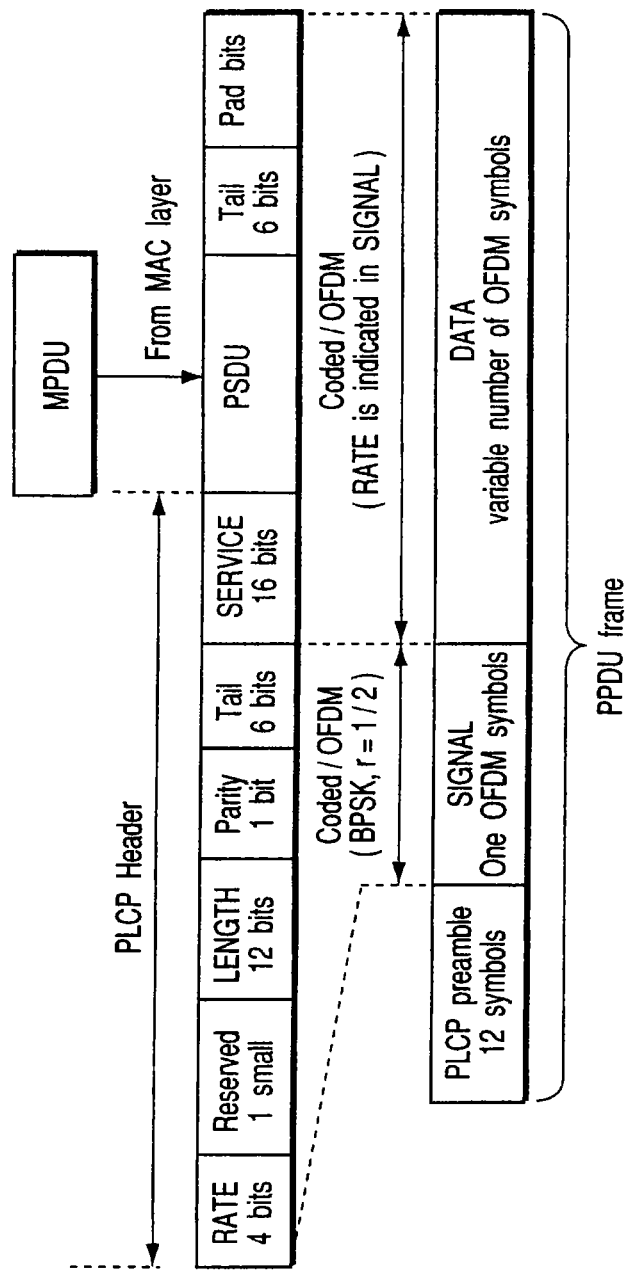
FIG. 14 is a view showing a PPDU frame format in an IEEE 802.11a wireless LAN system.

FIG. 14 shows a PPDU frame format in the IEEE 802.11a wireless LAN system. In this case, only codes corresponding to the above transfer rates are permitted to be used in the rate field, as shown in FIG. 15.

If, for example, communication based on a transfer rate higher than the above rates, e.g., 100 Mbits/s, is to be realized as a unique function, the transfer rate cannot be transferred according to the IEEE 802.11a wireless LAN system specification. On the receiving side, therefore, no PPDU frame can be acquired. For this reason, the first communication apparatus (base station or terminal station) having a function of transmitting at 100 Mbits/s and the second communication apparatus (base station or terminal station) which can at least receive this function set in advance a rule that a 100-Mbits/s transmission function (to be tentatively referred to as function X in this case) is represented by a specific identification code other than the identification codes of the transfer rates shown in FIG. 15.

The first communication apparatus having function X described above writes this predetermined identification code corresponding to function X in a rate field and transmits the resultant frame to notify the second communication apparatus serving as a communication partner of the possession of function X or actually transmit data at 100 Mbits/s by using this function. When the identification code corresponding to function X is to be written in the rate field to notify function X, dummy data may be set in the subsequent data field of the frame.

Assume that the second communication apparatus which has received the notification does not have function X or cannot support it. In this case, since a code outside the specification is written in the rate field, a PLCP header may not be properly recognized and the above frame may be discarded. If the first communication apparatus transmits the identification code corresponding to function X by using a frame that requires a response using an ACK frame, no ACK frame is transmitted from the second communication apparatus. When a timeout occurs in waiting for an ACK frame, the first communication apparatus can determine that the second communication apparatus as a communication partner does not have the function or support it.

Assume that the second communication apparatus has function X or can support it. In this case, upon reception of a frame in which the identification code corresponding to function X is written from the first communication apparatus, the second communication apparatus transmits a response using an ACK frame. The first communication apparatus can therefore determine that the second communication apparatus as a communication partner has function X or can support it or starts communication by using function X.

In the above case, the first communication apparatus may write the identification code of function X in the rate field and transmit it while actually transmitting a data field at 100 Mbits/s using the above function. If the second communication apparatus on the receiving side can at least support communication using function X, data can be received as a valid value. In this case, although there is no guarantee that the second communication apparatus can receive communication using function X, the procedure for using the function upon notification can be shortened.

The first to third embodiments can also be applied to the case of function X. In this case, function A described in the first to third embodiments may be replaced with function X.

The above description concerns a field for indicating a transfer rate in actually transmitting data. However, a transfer rate supported by a wireless communication apparatus complying with IEEE 802.11 can be used to notify in advance a wireless communication apparatus complying with IEEE 802.11 as a connection destination.

In an IEEE 802.11 wireless LAN system, a Supported Rates element for notifying a transfer rate supported by a wireless communication apparatus complying with IEEE 802.11 is prepared. This element is set in a beacon frame or a management frame such as an association request frame, association response frame, reassociation request frame, reassociation response frame, probe request frame, or probe response frame. A Supported Rates element is set depending on a transfer rate and whether it is a BSSBasicRateSet. A BSSBasicRateSet is a set of transfer rates which are set by a base station of a BSS or a terminal station which has started an IBSS and at which all wireless communication apparatuses complying with IEEE 802.11 comprising the BSS or IBSS must be able to perform transmission/reception.

Each transfer rate written in a Supported Rates element takes a value up to a 7-bit value (bit 0 to 6 in a bit field) expressed in a 1-byte area in units of 500 kbits/s, while "1" is set in the most significant bit in the area, i.e., the eighth bit (bit 7 in the bit field; MSB (Most Significant Bit)) if the rate belongs to the BSSBasicRateSet, and "0" is set in the MSB if the rate does not belong to the BSSBasicRateSet. If the rate is 1 Mbit/s and belongs to the BSSBasicRateSet, it is written as "82" in hexadecimal notation. If the rate is 2 Mbits/s and does not belong to the BSSBasicRateSet, it is written as "04".

With the format of a 1-byte area assigned to each transfer rate, only 63 Mbits/s in integral value can be expressed at maximum unless there is no question about whether the transfer rate is defined in the IEEE 802.11 wireless LAN family. In this case, in the IEEE 802.11 wireless LAN system, a transfer rate written in a Supported Rates element is the one written in an Operational Rate Set, and the effective range with respect to each transfer rate in this Operational Rate Set is "2" to "127". For example, the value "1" falls outside this effective range and obviously is an undefined value in the specification. In order to notify that transmission can be done at, for example, 100 Mbits/s, this undefined value "1" may be used as a code (value) describing 100 Mbits/s in a Supported Rates element. Obviously, an undefined value (a value that is not defined) may be selected from the effective range of "2" to "127".

If a value that is not used in the IEEE 802.11 specification is written as a Supported Rates element in a frame to notify that transmission can be done at 100 Mbits/s in this manner, transmission at 100 Mbits/s can be realized as in the first to third embodiments.

If, for example, an base station AP1 notifies a 100-Mbits/s transmission function (i.e., function X) by using a beacon frame in the above manner, a terminal station that can support 100 Mbits/s can notify the base station AP1, over an association request frame, that the terminal station can support 100 Mbits/s. If, however, the description of a transfer rate outside the IEEE 802.11 specification in a beacon frame from the base station AP1 interferes with reception processing by a terminal station that cannot support 100 Mbits/s, establishment of communication within the BSS cannot be guaranteed. Therefore, this terminal station must be configured to neglect the description of a transfer rate outside the above specification.

(Sixth Embodiment) Expansion of Function Identification Information Notification The technique for notifying a function outside the IEEE 802.11 specification has been described above. In this embodiment, if, for example, there are a plurality of versions with respect to one function, function identification information notification is expanded to allow notification of such version information.

Version information may be notified in a form of combining it with information concerning function notification or done in the same manner as in the first to fifth embodiments. In the latter case, for example, a base station AP1 notifies first, by using a beacon frame, a basic function, e.g., a function of performing communication at a high transfer rate, and a terminal station selects, by using an association request frame, a high transfer rate at which the terminal station itself can perform transmission/reception in the function, if there are a plurality of transfer rates, as needed, and includes it in a Supported Rates element. The base station then designates a transfer rate to be used by using an association response frame to the terminal station.

If it is known on the basis of a BSSID (MAC address) that a product is manufactured by the same vendor, only the version information of the product of the vendor may be notified. Note that a BSSID corresponds to a MAC address of the base station in an infrastructure mode.

As version information, information concerning a communication operation scheme such as link adaptation may be set.

If the level of a function is known from a version in this manner, and two stations have ability at the same level, they can communicate with each other at the level.

If there are a plurality of functions or versions, this technique can be applied to grouping corresponding to the functions or versions.

In the case of a terminal station which supports a multimode, this technique can be used to indicate which mode is to be used. Such a case includes a case wherein a multimode terminal or the like serves as a terminal station which supports three communication forms, i.e., a cellular system form, wireless LAN form, and PHS form.

Even a terminal station only limited to a wireless LAN system can be served as a multimode terminal station such as for IEEE 802.11 wireless LAN and HiperLAN 2. Furthermore, a terminal station supporting several versions of an IEEE 802.11 wireless LAN family such as IEEE 802.11a and IEEE 802.11b can be said as a multimode terminal station. By knowing which mode a terminal station can use in a system in which such multimode terminals exist together, when wireless resources in one mode are exhausted, a transition to another mode can be prompted.

In this manner, the above embodiment can be applied to more fragmented version information about functions outside the IEEE 802.11 specification as well as functions inside the specification. Since both a base station or terminal station and a communication partner mutually notify a function which each station can use or its version information, communication levels can be finely established in accordance with the versions.

Furthermore, a transition between modes in multimode-compatible terminal stations can be smoothly realized.

The present invention can also be distributed as a program which can be executed by a computer upon being stored in a storage medium such as a magnetic disk (e.g., a floppy disk or hard disk), an optical disk (e.g., a CD-ROM or DVD), or a semiconductor memory.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication device, comprising:
a transmitter configured to transmit a first management frame including a Service Set Identifier (SSID) field, the first management frame received by another communication device,
wherein the SSID field identifies a service set and a value of the SSID field includes a function identification code indicating a wireless communication function outside the IEEE 802.11 specification, and wherein the wireless communication function can be used for communication between the communication device and the another communication device when the function identification code is identified by the another communication device; and further comprising:

a receiver configured to receive a second management frame sent in response to the first management frame; and circuitry configured to determine whether the wireless communication function can be used based on the second management frame.

2. The communication device according to claim 1, wherein the SSID field consists of characters.

3. The communication device according to claim 1, wherein the function identification code is disposed in a lead portion of the SSID field.

4. The communication device according to claim 1, wherein the value of the SSID field is set by a user.

5. The communication device according to claim 1, wherein the first management frame is a probe request frame.

6. The communication device according to claim 1, wherein the second management frame is a probe response frame.

7. The communication device according to claim 1, wherein the wireless communication function is used for communication with another communication device that is a transmission source of the second management frame after an association process is completed with the another communication device.

8. The communication device according to claim 1, further comprising:

an antenna configured to transmit the first management frame.

9. A communication device, comprising:

a receiver configured to receive a first management frame including a Service Set Identifier (SSID) field, the first management frame transmitted by another communication device, wherein the SSID field identifies a service set and a value of the SSID field includes a function identification code indicating a wireless communication function outside the IEEE 802.11 specification, and wherein the wireless communication function can be used for communication between the communication device and the another communication device when the function identification code is identified by the communication device and further comprising:

a transmitter configured to transmit a second management frame in response to the first management frame, the second management frame generated based on a content of the first management frame, wherein the another communication device determines, based on the second management frame, whether the wireless communication function can be used.

10. The communication device according to claim 9, wherein the SSID field consists of characters.

11. The communication device according to claim 9, wherein the function identification code is disposed in a lead portion of the SSID field.

12. The communication device according to claim 9, wherein the first management frame is a probe request frame.

13. The communication device according to claim 9, wherein the second management frame is a probe response frame.

14. The communication device according to claim 9, wherein the wireless communication function is used for communication with another communication device that is a transmission source of the first management frame after an association process is completed with the another communication device.

15. The communication device according to claim 9, further comprising:

an antenna configured to receive the first management frame.

16. A communication method, comprising:

transmitting, by a transmitter of a communication device, a first management frame including a Service Set Identifier (SSID) field, the first management frame received by another communication device, wherein the SSID field identifies a service set and a value of the SSID field includes a function identification code indicating a wireless communication function outside the IEEE 802.11 specification, and wherein the wireless communication function can be used for communication between the communication device and the another communication device when the function identification code is identified by the another communication device: and further comprising:

receiving, by a receiver, a second management frame sent in response to the first management frame; and determining, by circuitry, whether the wireless communication function can be used based on the second management frame.

17. A communication method, comprising:

receiving, by a receiver of a communication device, a first management frame including a Service Set Identifier (SSID) field, the first management frame transmitted by another communication device, wherein the SSID field identifies a service set and a value of the SSID field includes a function identification code indicating a wireless communication function outside the IEEE 802.11 specification, and wherein the wireless communication function can be used for communication between the communication device and the another communication device when the function identification code is identified by the communication device; and further comprising:

transmitting, by a transmitter of the communication device, a second management frame in response to the first management frame, the second management frame generated based on a content of the first management frame, wherein the another communication device determines, based on the second management frame, whether the wireless communication function can be used.

* * * * *